J. PSIKAL.
MOTOR PROPULSION FOR AGRICULTURAL IMPLEMENTS.
APPLICATION FILED MAR. 8, 1920.

1,370,151.  Patented Mar. 1, 1921.
4 SHEETS—SHEET 1.

Fig. 1.

Inventor
Joseph Psikal,
by Charles J. Kappler,
Attorney

WITNESS:—
Chas. L. Grieshauer

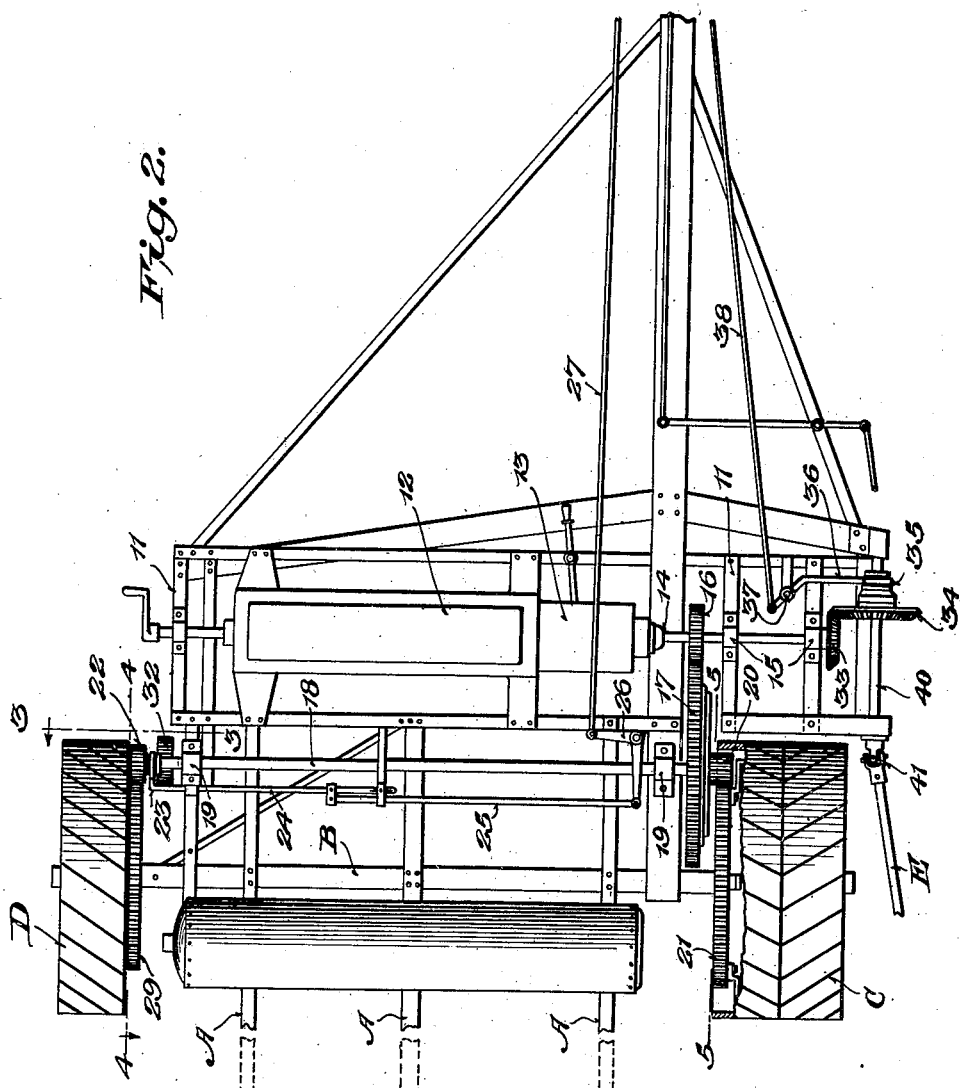

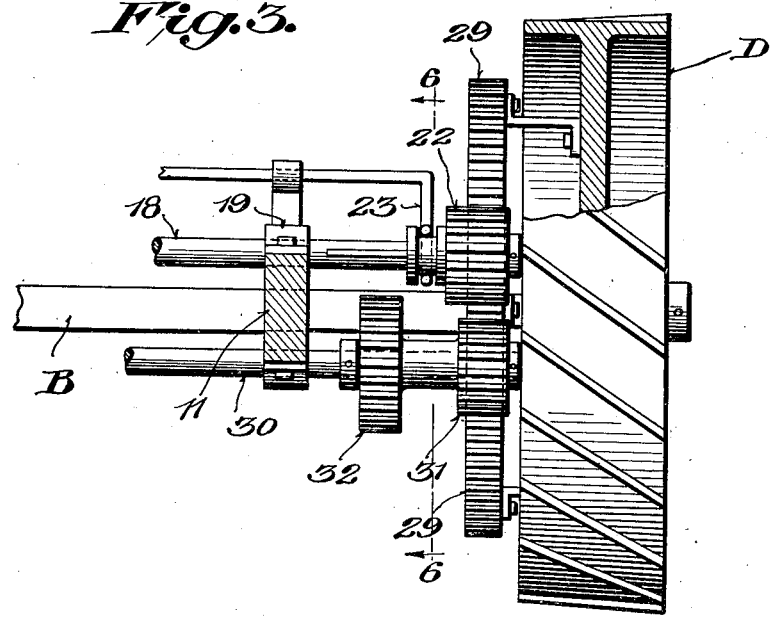
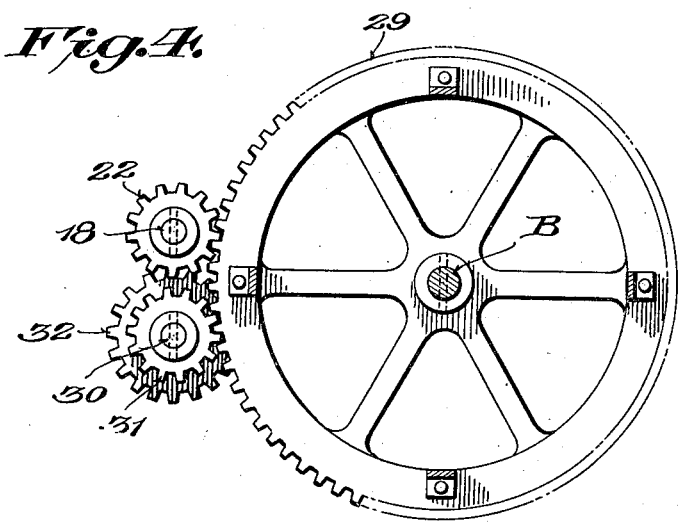

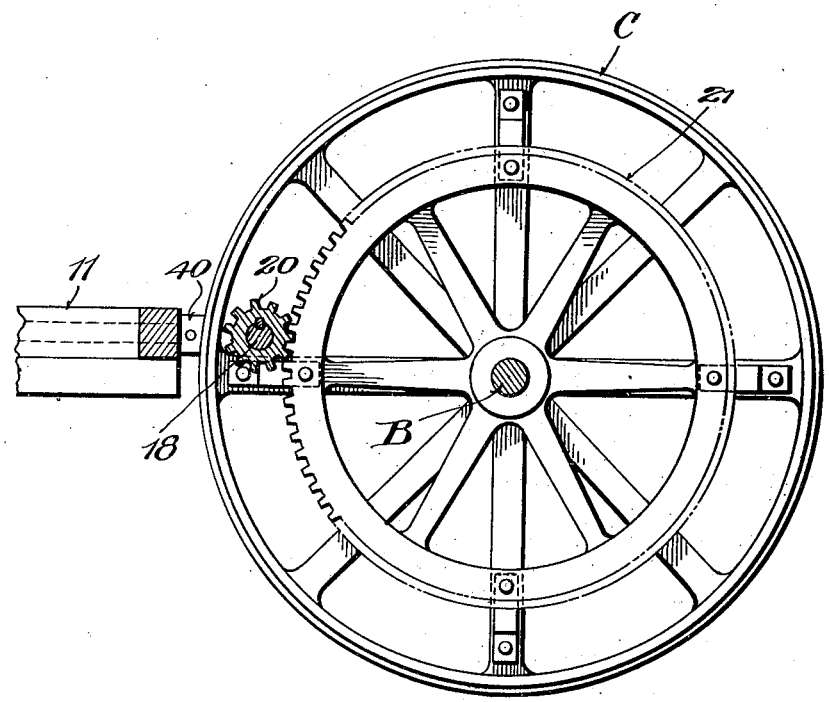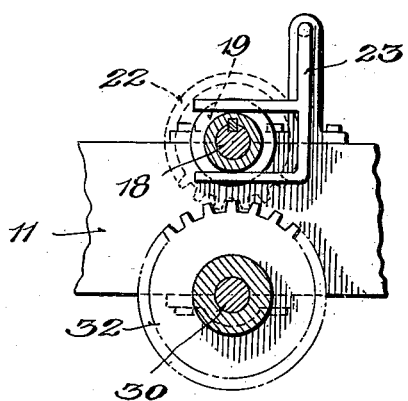

UNITED STATES PATENT OFFICE.

JOSEPH PSIKAL, OF PONCA CITY, OKLAHOMA.

MOTOR PROPULSION FOR AGRICULTURAL IMPLEMENTS.

1,370,151.　　　　　Specification of Letters Patent.　　Patented Mar. 1, 1921.

Application filed March 8, 1920. Serial No. 364,223.

*To all whom it may concern:*

Be it known that I, JOSEPH PSIKAL, a citizen of the United States, residing at Ponca City, in the county of Kay and State of Oklahoma, have invented certain new and useful Improvements in Motor Propulsion for Agricultural Implements, of which the following is a specification.

This invention relates to a motor-propelled pusher arranged to propel agricultural implements and to drive the parts thereof, and it is an object of the invention to provide an improved and efficient arrangement of that kind for association with a harvester and binder and similar implements.

When read in connection with the description herein, the details of construction and arrangement of parts contemplated by the invention will be apparent from the accompanying drawings, forming part hereof, wherein an adaptation of the invention associated with a harvester and binder is shown, for purposes of illustration.

While the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Figure 1 is an elevation of one side of the propelling device;

Fig. 2 is a plan view;

Fig. 3 is a view on the line 3—3, Fig. 2;

Fig. 4 is a view on the line 4—4, Fig. 2;

Fig. 5 is a view on the line 5—5, Fig. 2; and

Fig. 6 is an enlarged view of the gear-shifting arrangement.

Having more particular reference to the drawings, A designates frame members of an agricultural implement such as a harvester and binder, B an axle thereon, C and D traction-wheels on the axle, and E a drive element to impart motion, by suitable instrumentalities not shown, to the various parts of the implement.

Frame members 11 are connected with the frame of the implement and extend rearwardly therefrom, and thereon is mounted an engine 12, having a reverse-clutch 13 arranged to impart motion from the engine-shaft to a main shaft 14 journaled in bearings 15 on the frame members 11.

The main shaft has fast thereon a pinion 16 in mesh with a gear 17 on a counter-shaft 18 journaled in substantially parallel relation to the main shaft in bearings 19 on the frame members. A pinion 20, fast on the counter-shaft, is in mesh with a gear 21 secured to the traction-wheel C.

A pinion 22 is slidably keyed to and is movable axially on the other end portion of the counter-shaft, such movement being imparted to the pinion by a lever 23 associated with the hub of the pinion and connections 24, 25, 26, and 27 and a hand-lever 28 at the rear of the machine.

The pinion 22 is movable into and out of mesh with a gear 29 secured to the traction-wheel D. A stub-shaft 30 is journaled on frame members below the counter-shaft, and it has thereon a pinion 31 in mesh with the gear 29 and a gear 32 arranged to be engaged by the pinion 22 after it has been moved axially from mesh with the gear 29.

The arrangement is such that the pinion 22 may be withdrawn from engagement with the gear 29 to discontinue driving action on that side of the machine, and on further axial movement it may be caused to mesh with gear 32 and thus impart rearward rotation to the traction-wheel D through the instrumentality of the stub-shaft 30 and the gear and pinion thereon. Thus the driving action in a forward direction on that side of the machine may be discontinued and driving action on the other side continued when it is desired to give a short turn to the implement, and rearward action may be given the traction-wheel D when it is desired to make a shorter turn.

A bevel-gear 33 is fast on the end portion of the main shaft and is in mesh with a bevel-gear 34 arranged to impart rotation through the instrumentality of a clutch 35, controlled by connections 36, 37, and 38 and a hand-lever 39 at the rear of the machine, to a shaft 40. That shaft is connected by a universal joint 41 with the drive element E of the implement.

The frame formed of members 11 is supported at its rear end by a caster-wheel 42, which may be controlled for ordinary guiding of the implement by an upright shaft 43 and a lever 44 within reach of the operator; and the hand-levers hereinbefore mentioned also are in reach of the operator.

Having thus described my invention, what I claim as new, and desire to secure by Letters Patent, is—

1. The combination, with an implement having traction-wheels, of a frame secured to said implement whereby it is supported at one end and being wheel-supported at the other end, an engine on said frame, a gear on each of said traction-wheels, a counter-shaft, a pinion on one end portion of the counter-shaft in mesh with a traction-wheel gear, a pinion on the other end portion of the counter-shaft movable into and out of mesh with the other traction-wheel gear, a driving connection between said engine and said counter-shaft, and means associated with said counter-shaft and said axially-movable pinion whereby one of said traction-wheels may be driven in a reverse direction.

2. The combination, with an implement having traction-wheels, of a frame secured to said implement whereby it is supported at one end and being wheel-supported at the other end, an engine on said frame, a gear on each of said traction-wheels, a counter-shaft, driving connections between the engine and the counter-shaft, a pinion on one end portion of the counter-shaft in mesh with one of the traction-wheel gears, a pinion on the other end portion of the counter-shaft axially movable into and out of mesh with the other traction-wheel gear, a stub-shaft, a pinion on said stub-shaft in mesh with the latter traction-wheel gear, and a gear also on said stub-shaft positioned for engagement by said axially-movable pinion when out of mesh with its traction-wheel gear.

3. The combination, with an implement having a drive element to actuate its parts and traction-wheels, of a frame secured in its front portion to said implement and wheel supported in its rear portion, an engine on said frame, a main shaft driven by said engine, a clutch interposed between said engine and the main shaft, a counter-shaft driven by suitable means from said main shaft, a gear on one of said traction-wheels, a pinion on said counter-shaft in mesh with said gear, a gear on another of said traction-wheels, a second pinion axially movable on said counter-shaft, means for moving said second pinion into and out of mesh with said last-named gear, a stub-shaft, on said stub-shaft a pinion in mesh with said last-named traction-wheel gear and a gear also on said stub-shaft arranged to be engaged with said second counter-shaft pinion, and means for driving said drive element from said main shaft.

In witness whereof, I affix my signature.

JOSEPH PSIKAL.